(12) United States Patent
Moorefield

(10) Patent No.: US 8,702,075 B1
(45) Date of Patent: Apr. 22, 2014

(54) VEHICLE SHOCK ABSORBER COLLAR

(76) Inventor: Matthew C. Moorefield, Stokesdale, NC (US)

(*) Notice: Subject to any disclaimer, the term of this patent is extended or adjusted under 35 U.S.C. 154(b) by 964 days.

(21) Appl. No.: 12/364,654

(22) Filed: Feb. 3, 2009

(51) Int. Cl.
*F16F 1/12* (2006.01)

(52) U.S. Cl.
USPC ............ 267/177; 267/175; 267/218; 267/221

(58) Field of Classification Search
USPC .................. 267/195, 218, 221, 34, 175, 177
See application file for complete search history.

(56) References Cited

U.S. PATENT DOCUMENTS

| | | | |
|---|---|---|---|
| 2,625,388 A | 1/1953 | Herreshoff et al. ............. | 267/60 |
| 2,661,206 A | 12/1953 | Gregoire ......................... | 267/60 |
| 2,697,600 A | 12/1954 | Gregoire ......................... | 267/61 |
| 2,801,112 A | 7/1957 | Piper .............................. | 280/96.2 |
| 2,801,113 A | 7/1957 | Piper .............................. | 280/96.2 |
| 3,033,590 A | 5/1962 | Statler ............................ | 280/124 |
| 3,559,976 A | 2/1971 | Jerz, Jr. .......................... | 267/61 |
| 3,830,482 A | 8/1974 | Norris ............................ | 267/61 |
| 4,744,444 A | 5/1988 | Gillingham .................... | 188/315 |
| 4,830,395 A | 5/1989 | Foley ............................. | 280/698 |
| 5,044,614 A | 9/1991 | Rau ................................ | 267/221 |
| 5,116,016 A | 5/1992 | Nagata .......................... | 248/578 |
| 5,306,031 A | 4/1994 | Quinn et al. ................... | 280/688 |
| 5,553,836 A | 9/1996 | Ericson ......................... | 267/286 |
| 6,902,045 B2* | 6/2005 | Oliver et al. ............. | 188/321.11 |
| 7,357,382 B2 | 4/2008 | Pare et al. ..................... | 267/220 |

* cited by examiner

*Primary Examiner* — Bradley King
*Assistant Examiner* — Vu Q Nguyen
(74) *Attorney, Agent, or Firm* — Blake P. Hurt

(57) ABSTRACT

A unique, adjustable collar for a shock absorber coil-over spring is positioned on top of the coil-over spring and below the shock lock nut. The collar serves as a bearing that can be adjusted to increase or decrease the tension applied to the coil-over spring making for easier adjustments. The collar in the preferred form has eight (8) conical gears that mate with corresponding teeth in the top. The gears are turned clockwise or counterclockwise to respectively raise or lower the ride height of the vehicle. A typical one quarter inch (¼") socket extension or similar tool can be used to turn the gears.

7 Claims, 5 Drawing Sheets

VEHICLE SHOCK ABSORBER COLLAR

FIELD OF THE INVENTION

The invention herein pertains to shock absorbers and more particularly pertains to an adjustable collar for use with a shock absorber coil-over spring system to adjust the tension of the spring to thus raise or lower a vehicle's ride height as desired.

DESCRIPTION OF THE PRIOR ART AND OBJECTIVES OF THE INVENTION

In the past various types of shock absorbers and adjustable suspension systems have been developed. U.S. Pat. No. 5,553,836 teaches an adjustable suspension system utilizing a threaded collar. U.S. Pat. No. 7,357,382 uses a spring perch to automatically center a load. U.S. Pat. No. 5,044,614 shows a shock absorber assembly hides a lock nut which is adjustable and provides a lock nut which can be secured with a hand tool.

It is desirable to adjust the height of a vehicle's ride in an efficient manner without the need for special tools and equipment. It is also desirable to provide an adjustable shock absorber which can be easily retrofitted to existing vehicle suspension systems. Most of the prior devices and known systems require special tools, jacks, spanner wrenches, training and skills to precisely adjust the ride height of a vehicle. Large frictional forces exerted by the coil-over spring make current shock adjustment systems having a lock nut difficult to adjust.

Thus in view of the problems and disadvantages associated with conventional suspension systems, techniques and methods for shock adjusting, the present invention was conceived and one of its objectives is to provide an adjustable collar for a shock absorber with a coil-over spring that can be easily and precisely adjusted without jacks while the vehicle is on the ground.

It is another objective of the present invention to provide an adjustable collar for a shock absorber with a coil-over spring which is relatively simple to manufacture and install and inexpensive to sell and purchase.

It is still another objective of the present invention to provide an adjustable collar for a shock absorber with a coil-over spring that does not require a spanner wrench for adjustment purposes but rather includes a plurality of internal radially positioned conical gears which can be easily adjusted.

It is yet another objective of the present invention to provide an adjustable collar for a shock absorber with a coil-over spring which in one form has a central threaded flange and in an alternate form includes a central smooth walled flange.

Various other objectives and advantages of the present invention will become apparent to those skilled in the art as a more detailed description is set forth below.

SUMMARY OF THE INVENTION

The aforesaid and other objectives are realized by providing an adjustable collar having central threads which fit a typical vehicle shock absorber housing. The collar includes a top which is rotatably mounted to a bottom containing a plurality of radially displaced conical gears. Grommets which are attached to the gears are positioned in the outer wall of the bottom provide circumferential ports for easy access and gear rotation purposes. By turning one of the gears the teeth of the top which engage the cogs of the gears will cause the top to rotate relative to the bottom. As the top rotates in one direction the top flange which is threaded is moved along the outer threads of the shock absorber housing which allows the coil-over spring on the shock absorber to lengthen or raise. A shock lock nut atop the collar is first loosened and raised to permit the collar to move upwardly, as the coil-over spring expands. Once the coil-over spring has been properly adjusted the shock lock nut is then tightened against the top surface of the collar to maintain the collar and coil-over spring in its adjusted position. A standard one quarter inch (¼") socket extension or other tool can be inserted in the circumferential port defined by the gear grommet in the outer wall to turn the conical gears for adjustment purposes.

In a second embodiment of the invention, the collar top is without flange central threads and allows the collar to slide along the outer housing of the shock absorber. The top of the collar includes a lug for engagement with a slot in a threaded adjustment nut. In this embodiment the adjustment nut is positioned atop the collar and a shock lock nut is positioned atop the adjustment nut. With the shock lock nut loosened and the adjustment nut loosened, which are both threaded onto the outer housing of the shock absorber, by turning one of the conically shaped gears the coil-over spring can be raised or lowered to provide a "higher" or "lower" ride of the vehicle. If the collar has been raised, by reversing the rotation of the gears the collar can be lowered. Thereafter the shock lock nut and adjustment nut are again tightened to secure the coil-over spring in the desired position.

DETAILED DESCRIPTION OF THE PREFERRED EMBODIMENT AND OPERATION OF THE INVENTION

Figure 1:
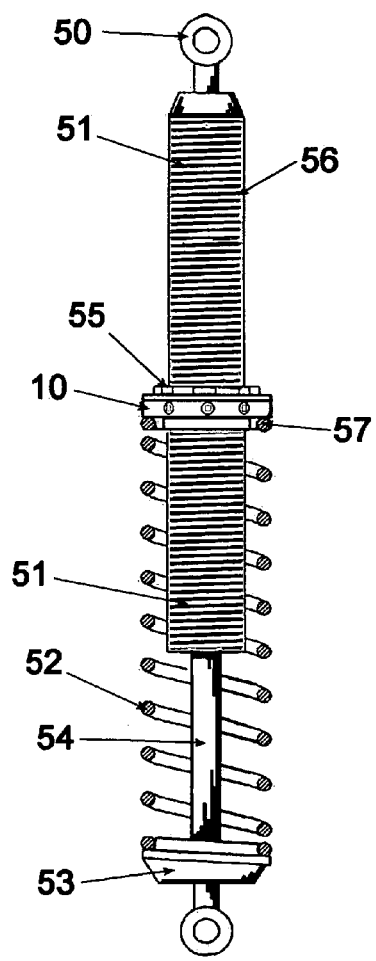
FIG. 1 demonstrates the preferred form of the adjustable shock collar mounted on a typical shock absorber in contact with the coil-over spring.

For a better understanding of the invention and its operation, turning now to the drawings, FIG. 1 illustrates preferred adjustable shock collar 10 positioned on conventional shock absorber 50 as may be used on a typical passenger car, truck, motorcycle or other vehicle. Shock absorber 50 includes housing 56 with threads 51, shock absorber piston rod 54 received within housing 56 and coil-over spring 52 maintained therearound between standard shock lock nut 55, shock collar 10 and spring support 53 for tension purposes and ride height adjustability. Adjustable shock collar 10 is shown positioned on shock absorber 50 between shock lock nut 55 and top coil 57 of coil-over spring 52. Top coil 57 is contiguous shock collar 10 while the opposing (lower) end of coil-over spring 52 is retained by usual spring support 53. As seen in FIG. 1, coil-over spring 52 is shown in an extended or relaxed position. Standard shock lock nut 55 is threadably received on threads 51 of shock absorber housing 56.

Figure 2:
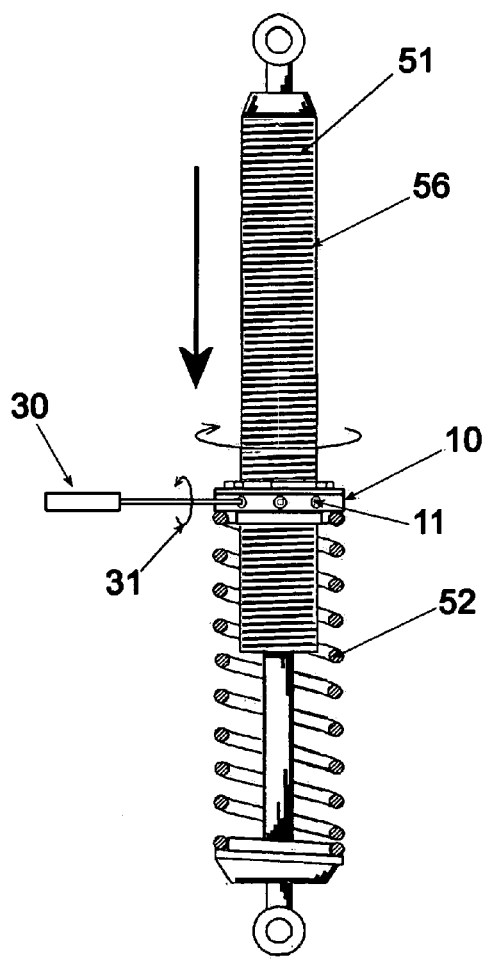
FIG. 2 illustrates the shock collar of FIG. 1 which has been adjusted to lower the vehicle ride.
Figure 3:
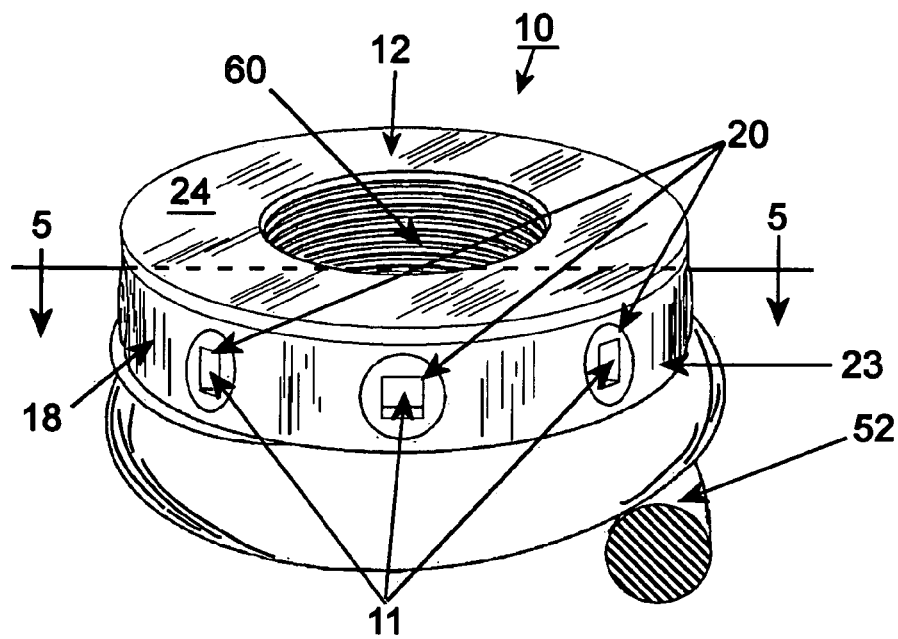
FIG. 3 shows the shock collar of FIG. 1 removed from the shock absorber.

If it is desired to make the vehicle ride in a higher fashion, coil-over spring 52 is placed under greater tension as seen in FIG. 2 by compressing coil-over spring 52. To do so, adjustable shock collar 10 is rotated to move downwardly along shock housing threads 51. Tool 30 such as a one quarter inch (¼") (0.635 cm) socket extension or similar tool is inserted into one of the circumferential ports 11 within shock collar 10 seen in various views in FIGS. 1-6. Tool 30 is turned in a counterclockwise direction as demonstrated by arrow 31 in FIG. 2 causing collar 10 to rotate downwardly thus pressing and compacting coil-over spring 52 while increasing the tension thereof and providing additional height to the vehicle ride. Once collar 10 is so adjusted, shock lock nut 55 is then turned manually until it rests in full contact against planar surface 24 of top 12 as seen in FIG. 3. To release the spring tension, tool 30 is simply turned in a clockwise direction causing collar 10 to move upwardly to relieve the tension of coil-over spring 52, as demonstrated in FIG. 1.

Figure 4:
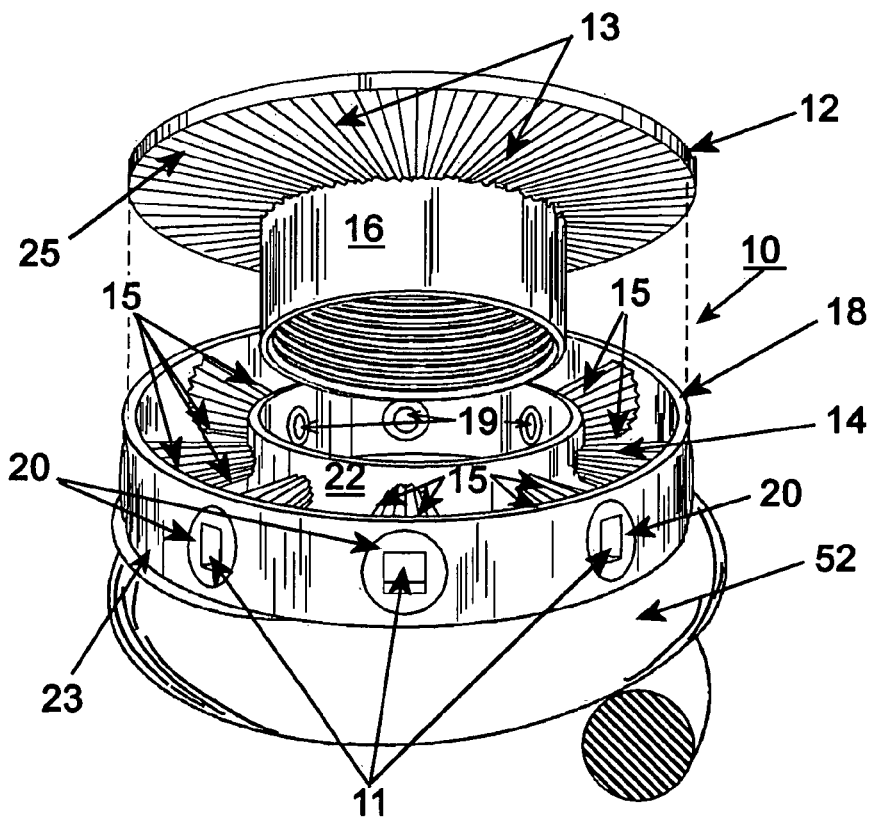
FIG. 4 depicts the shock collar as seen in FIG. 3 with the top exploded therefrom.
Figure 5:
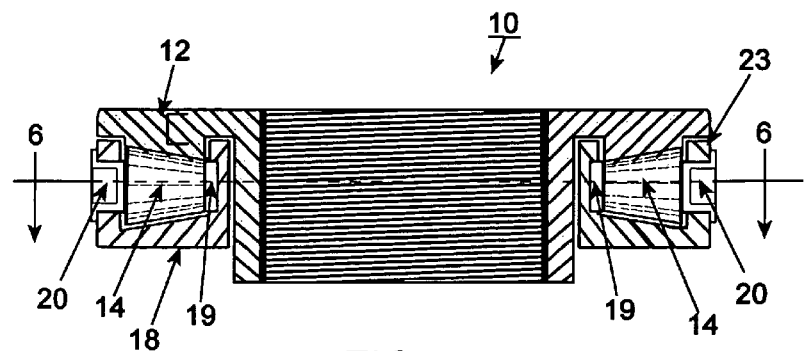
FIG. 5 features a cross sectional view of the shock collar along lines 5-5 of FIG. 3.
Figure 6:
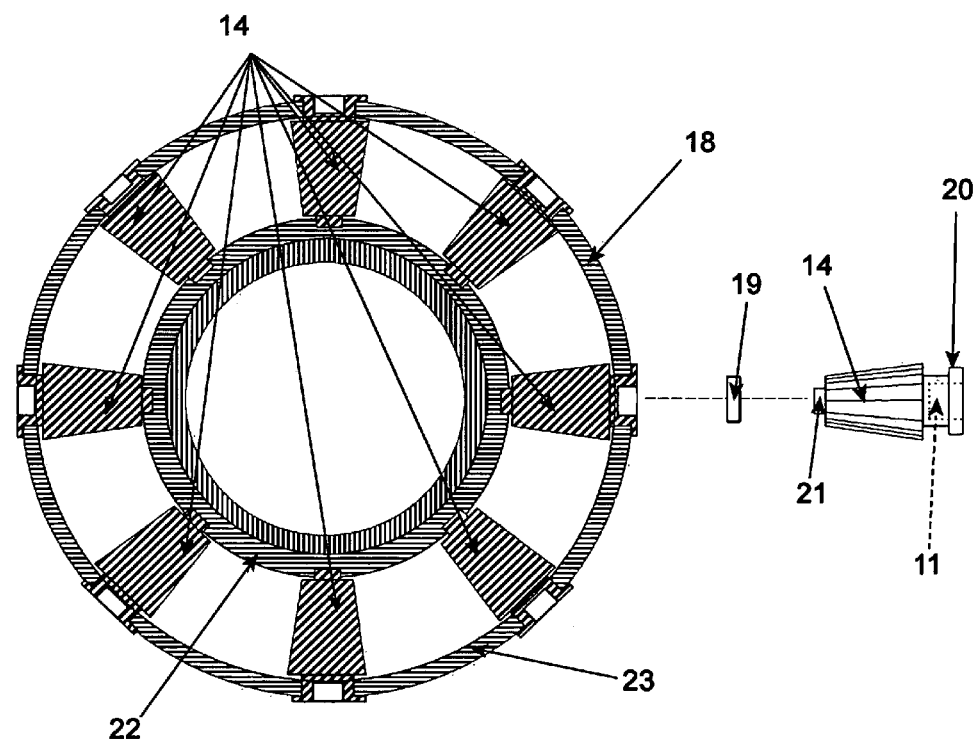
FIG. 6 pictures the shock collar as along lines 6-6 as seen in FIG. 5.
Figures 7, 8:
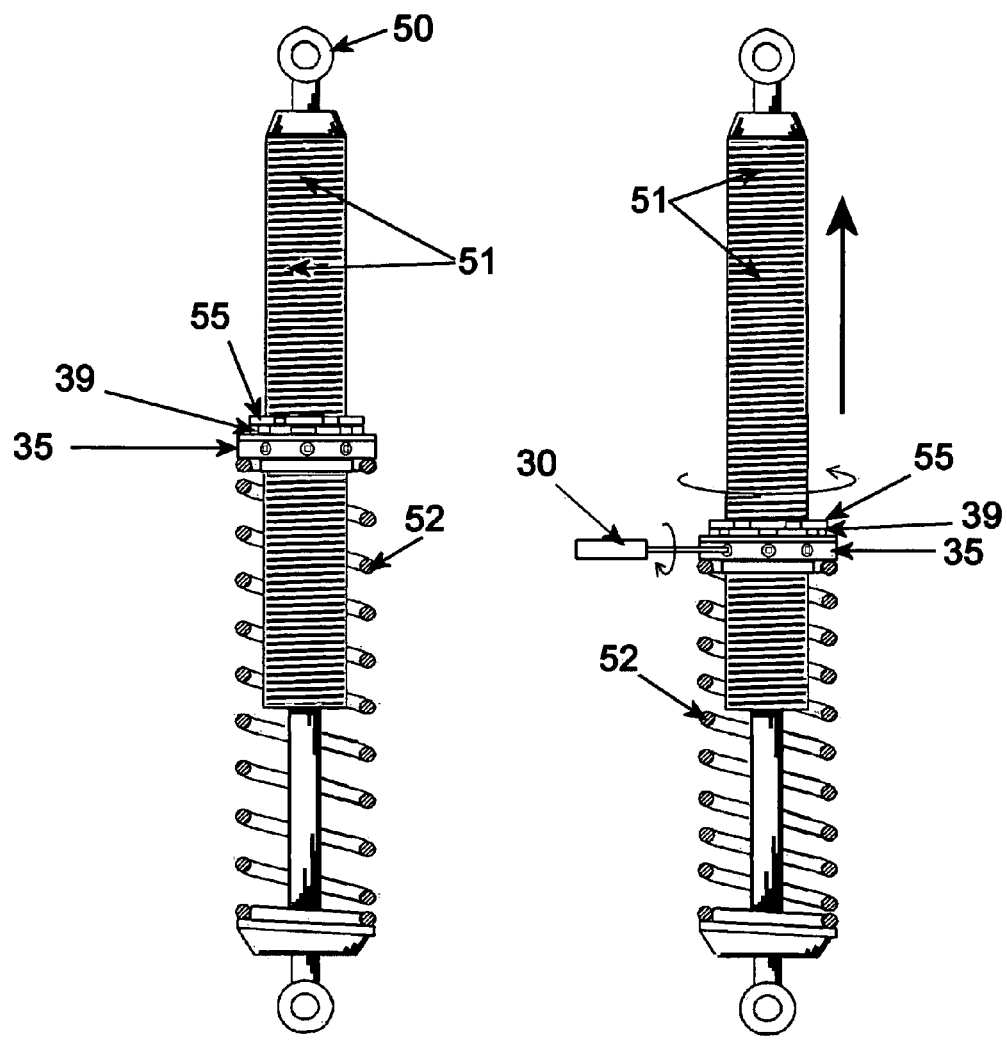
FIG. 7 demonstrates an alternate form of the shock collar as seen in FIGS. 1-6 mounted on a standard shock absorber.
FIG. 8 illustrates the shock absorber as seen in FIG. 7 which has been raised from the position seen in FIG. 7.

As further illustrated in FIGS. 3-6, preferred shock collar 10 includes top 12 and bottom 18. Top 12 includes top planar surface 24 and lower surface 25 defining a plurality of threads 13 radiating from centrally positioned flange 16 (FIG. 4). Flange 16 is threaded internally and provides shock housing channel 60 (FIG. 3) for engaging shock housing threads 51 as seen in FIGS. 1 and 2. Bottom 18 includes outer wall 23 surrounding and concentric with inner wall 22 which is sized to slideably receive flange 16 of top 12. Bottom 18 contains eight (8) conically shaped gears 14 having gear shafts 21 (FIG. 6), grommets 20 and cogs 15 (FIG. 4) which enmesh threads 13 on lower surface 25 of top 12 for rotational purposes. Inner wall 22 of bottom 18 includes bearings 19 (FIGS. 4 and 6) which receive gear shafts 21 to assist in rotation of gears 14. Outer wall 23 of bottom 18 contains grommets 20 shown integrally formed with gear 14. Grommets 20 define circumferential ports 11 therein and provide access for tool 30 as shown in FIGS. 2 and 7 in order to rotate gear 14 for easy adjustment of shock collar 10. In FIG. 6 only one conical gear 14 has been exploded to better illustrate standard bearing 19, gear shaft 21 and integral grommet 20.

Gear shaft 21 of gear 14 is rotatably mounted within bearing 19 which is rotatably mounted in inner wall 22 as seen in FIGS. 4, 5 and 6. Inner wall 22 has an inner diameter to allow flange 16 of top 12 to easily rotate as gears 14 are turned. FIG. 6 shows a partial cross-sectional view taken along lines 6-6 of FIG. 5 schematically illustrating the eight radially positioned conical gears 14 in bottom 18 with a single bearing 19 and conical gear 14 removed for clarity. As would be understood, grommet 20 defines a circumferential port 11 which provides access for tool 30 as shown in FIG. 2. Thus, as grommet 20 is rotatably mounted in bottom outer wall 23, by rotating grommet 20, cogs 15 of gear 14 engage threads 13 of top 12 as shown in FIG. 4 to cause top 12 to rotate relative to bottom 18.

Figure 9:
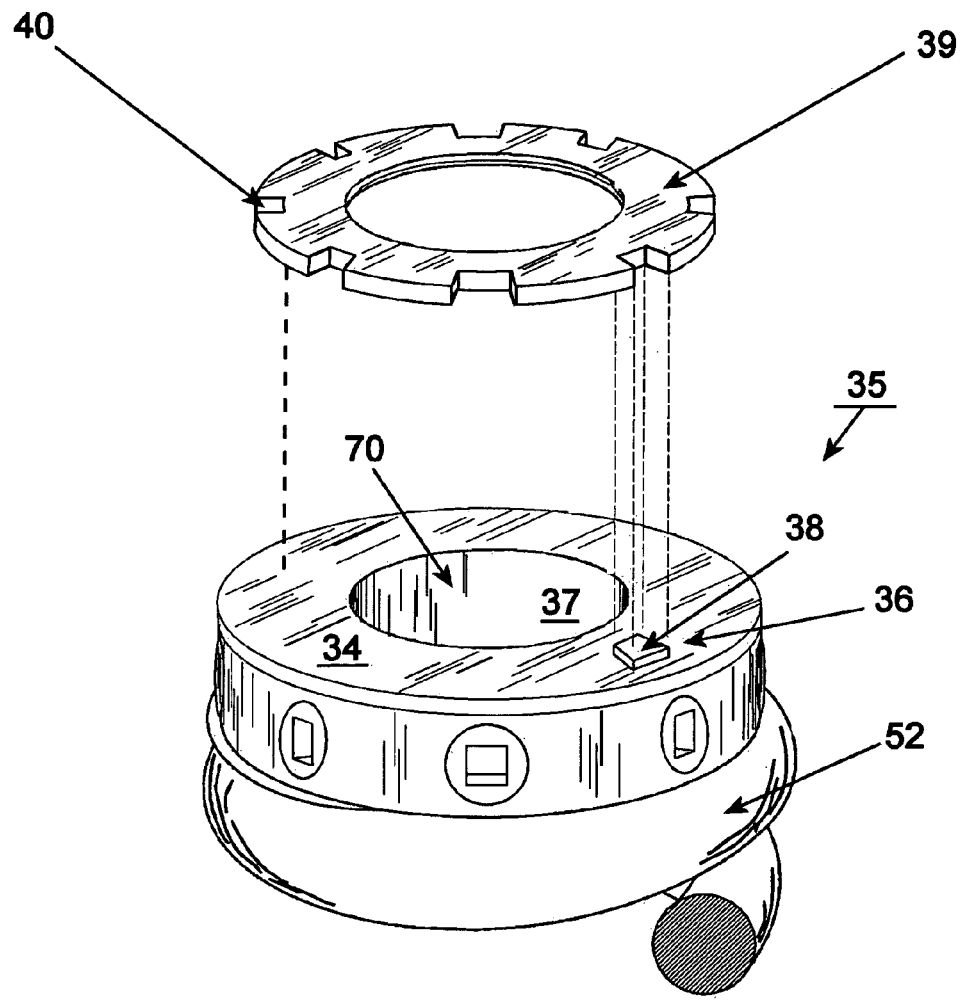
FIG. 9 depicts the alternate shock collar of FIG. 7 as removed from the shock absorber and with the adjustment nut exploded therefrom.

In an alternate embodiment of the invention as shown in FIGS. 7, 8 and 9, shock collar 35 is somewhat similar to preferred shock collar 10. However, top 36 of collar 35 is constructed with flange 37 (FIG. 9) having no inner threads, thus providing a smooth central shock housing channel 70 (FIG. 9) for slidably positioning on shock housing threads 51. Also, top 36 includes lug 38 on upper surface 34 (approximately one quarter inch (¼") (0.635 cm) in height) to engage slot 40 of standard adjustment nut 39, also shown in FIG. 9. Adjustment nut 39 is threaded on shock threads 51 and positioned between shock lock nut 55 which is also threaded and collar 35 which is not threaded. Standard threaded adjustment nut 39 includes slots 40 for receiving lug 38 and adjustment nut 39 acts as a safety feature as shock lock nut 55 and adjustment nut 39 are tightened together on shock absorber 50 after collar 35 is properly positioned for the desired tension on shock coil-over spring 52.

As shown in FIG. 7, after loosening shock lock nut 55 and rotating tool 30, top 36 (FIG. 9) of collar 35 is rotated causing adjustment nut 39 which is in frictional engagement therewith to likewise rotate as lug 38 is engaged in one of notches 40 and turn in the direction desired, raising or lowering collar 35. Therefore as earlier described, coil-over spring 52 is allowed to increase or decrease in tension and height for the desired vehicle ride. Shock lock nut 55 is then tightened against adjustment nut 39 which is in contact with surface 34 of top 36 to secure collar 35 in place.

The illustrations and examples provided herein are for explanatory purposes and are not intended to limit the scope of the appended claims.

I claim:

1. A collar for a shock absorber housing coil-over spring useful in adjusting the tension of the spring comprising: a planar threaded top, a plurality of bidirectional conical gears, a bottom, said planar threaded top rotatably joined to said bottom, said plurality of conical gears disposed radially between said planar threaded top and said bottom, a plurality of grommets, each of said plurality of grommets axially aligned with and attached to different ones of said plurality of conical gears, each of said plurality of grommets defining a circumferential port, each of said circumferential ports for reception of a socket extension, whereby turning one of said conical gears in either direction will rotate said planar threaded top relative to said bottom.

2. The collar of claim 1 further defining a shock housing channel.

3. The collar of claim 2 wherein said shock housing channel is threaded.

4. The collar of claim 1 wherein said planar threaded top defines a plurality of threads radially extending from the center of said top.

5. The collar of claim 1 further comprising a plurality of bearings, said bearings positioned proximate said plurality of said conical gears.

6. The collar of claim 1 further comprising a flange, said flange vertically affixed to said planar threaded top.

7. The collar of claim 5 wherein said plurality of conical gears further comprise a plurality of shafts, each shaft attached to different ones of said conical gears and positioned at the terminal end of said gears for engaging said bearings.

* * * * *